(12) United States Patent
Goto

(10) Patent No.: US 7,990,694 B2
(45) Date of Patent: Aug. 2, 2011

(54) PORTABLE INFORMATION PROCESSING APPARATUS

(75) Inventor: Takeshi Goto, Saitama (JP)

(73) Assignee: Sony Corporation (JP)

( * ) Notice: Subject to any disclaimer, the term of this patent is extended or adjusted under 35 U.S.C. 154(b) by 121 days.

(21) Appl. No.: 12/381,988

(22) Filed: Mar. 18, 2009

(65) Prior Publication Data

US 2009/0237875 A1 Sep. 24, 2009

(30) Foreign Application Priority Data

Mar. 19, 2008 (JP) ............................... P2008-072120

(51) Int. Cl.
H05K 7/12 (2006.01)

(52) U.S. Cl. ......... 361/679.26; 361/679.21; 361/679.09; 361/727; 455/575.3; 455/575.4; 248/917

(58) Field of Classification Search ............. 361/679.26, 361/679.01, 679.08, 679.09, 679.3, 679.55, 361/679.56, 724–727, 679.21; 455/575.4, 455/675.1–575.3; 345/168–172; 400/472–496; 341/22–33; 248/917–924
See application file for complete search history.

(56) References Cited

U.S. PATENT DOCUMENTS

| 2004/0039950 | A1 | 2/2004 | Okamoto et al. | |
| 2004/0160413 | A1 | 8/2004 | Tamai et al. | |
| 2008/0045279 | A1* | 2/2008 | Ohki | 455/575.1 |
| 2008/0174942 | A1* | 7/2008 | Yang et al. | 361/680 |

FOREIGN PATENT DOCUMENTS

| JP | 11164184 A | 6/1999 |
| JP | 2002-533821 T | 10/2002 |
| JP | 2003-044169 A | 2/2003 |
| JP | 2003244491 A | 8/2003 |
| JP | 2004-086330 A | 3/2004 |
| JP | 2004-246605 A | 9/2004 |
| JP | 2005-092658 A | 4/2005 |
| JP | 2006-005564 A | 1/2006 |
| JP | 2007-142936 A | 6/2007 |

OTHER PUBLICATIONS

Office Action from Japanese Application No. 2008-072120, dated Jul. 20, 2010.

* cited by examiner

Primary Examiner — Jayprakash N Gandhi
Assistant Examiner — Ingrid Wright
(74) Attorney, Agent, or Firm — Lerner, David, Littenberg, Krumholz & Mentlik, LLP

(57) ABSTRACT

A portable information processing apparatus, includes: a body section configured to have an upper face on which a keyboard for inputting information is provided at least; and a display section configured to have an upper face on which a display member for displaying information is provided at least; the display section being mounted for sliding movement between a first position at which the display section is placed in an overlapping relationship at an upper portion of the body section and a second position at which the display section opens the upper portion of the body section, the display section being mounted for tilting up and down movements with respect to the body section when the display section is at the second position.

5 Claims, 13 Drawing Sheets

PORTABLE INFORMATION PROCESSING APPARATUS

CROSS REFERENCES TO RELATED APPLICATIONS

The present application claims priority from Japanese Patent Application No. JP 2008-072120, filed in the Japanese Patent Office on Mar. 19, 2008, the entire content of which is incorporated herein by reference.

BACKGROUND OF THE INVENTION

1. Field of the Invention

This invention relates to a portable information processing apparatus represented, for example, by an ultra mobile personal computer (UMPC) which has functions equivalent to those of a notebook type personal computer but is small in size and superior in portability while an inputting operation such as a key inputting operation can be carried out readily in a state wherein it is held by a hand of a user.

2. Description of the Related Art

Several portable information processing apparatus which are small in size and superior in portability while an inputting operation such as a key inputting operation can be carried out readily in a state wherein it is held by a hand of a user have been proposed by the assignee of the present application. In some of the portable information processing apparatus, a flattened display section of a rectangular shape is placed on a flattened body section of a rectangular shape such that the display section is opened or closed with respect to the body section by a sliding movement or a tilting movement thereof. When the display section is opened, operation keys mounted on the body section which are covered with the display section when the display section is closed are exposed to allow operation thereof by the user. The portable information processing apparatus of the type just described thus achieve enhancement of the portability and so forth by miniaturization. A portable information processing apparatus of the type is disclosed, for example, in Japanese Patent Laid-Open Nos. 2004-246605, 2005-92658, 2007-142936 or 2004-86330.

SUMMARY OF THE INVENTION

The portable information processing apparatus are disadvantageous in the following points.

The portable information processing apparatus wherein the display section is closed with respect to the body section by a sliding movement thereof is disadvantageous in that, when it is used on a desk, a great space is demanded and the user cannot easily observe the screen image of the display section.

Meanwhile, the portable information processing apparatus wherein the display section is closed with respect to the body section by a tilting movement thereof does not demand space in use thereof on a desk. However, where the portable information processing apparatus of the type employs the touch inputting system such as a tablet wherein the user touches directly with the screen of the display section to carry out inputting, it is disadvantageous in that, upon such touch inputting, the display section is liable to tilt with respect to the body section and therefore the operability is low.

Further, where the portable information processing apparatus is of the type wherein the display section is closed only by a sliding movement or a tilting movement, it is disadvantageous in that it cannot allow diversification of changeover among various modes.

According the present embodiment, there is provided a portable information processing apparatus including a body section having an upper face on which a keyboard for inputting information is provided at least, and a display section having an upper face on which a display member for displaying information is provided at least, the display section being mounted for sliding movement between a first position at which the display section is placed in an overlapping relationship at an upper portion of the body section and a second position at which the display section opens the upper portion of the body section, the display section being mounted for tilting up and down movements with respect to the body section when the display section is at the second position.

In the portable information processing apparatus, since the display section carries out a sliding movement and tilting up and down movements at an upper portion of the body section on which the keyboard is provided, the portable information processing apparatus can be used suitably in both of a case wherein it is used on a desk and another case wherein it is held by hand and used. Therefore, the portable information processing apparatus is superior in convenience in use. Further, although the single portable information processing apparatus is used, it can make use of the sliding movement and the two movements of the tiling up movement and the tilting down movement of the display section with respect to the body section to carry out automatic changeover of the mode between the hand writing mode wherein a touch pen or the like is used to carry out hand writing and the keyboard inputting mode wherein a keyboard is used for inputting. Consequently, diversification of mode changeover can be achieved.

Preferably, the portable information processing apparatus further includes a slide mechanism provided on the body section for slidably moving the display section between the first position and the second position, and a tilt-up and tilt-down mechanism for tilting up and down the display section at the second position, the tilt-up and tilt-down mechanism being configured for movement into and out of contact with a slide guide of the slide mechanism. With the portable information processing apparatus, changeover between the sliding movement of the display section between the first position and the second position and the tilting up or down movement of the display section can be carried out smoothly without interruption.

Preferably, the portable information processing apparatus further includes a battery accommodated in the body section. Particularly, the battery is disposed at a position displaced to the opposite side to the sliding direction of the display section from the first position to the second position such as a position adjacent the front face side of the body section. Consequently, when the display section is slidably moved to the second position to open the upper portion of the display section, the portable information processing apparatus can be stabilized in a horizontal posture making use of the weight of the battery. In this state, a keyboard operation can be canner out smoothly.

Preferably, the portable information processing apparatus further includes a first sensor for detecting that the sliding movement of the display section from the first position to the second position is started, a second sensor for detecting that the tilting up movement of the display section at the second position is started, and a control section for establishing a first inputting mode in response to the detection by the first sensor and establishing a second inputting mode in response to the detection by the second sensor. With the portable information processing apparatus, only by carrying out a sliding operation and an tilting up operation of the display section, automatic changeover between the first mode and the second mode can be carried out, and therefore, the operability is high.

In this instance, the portable information processing apparatus may be configured such that, when the first inputting mode is established, the control section controls the display section to execute display corresponding to the first inputting mode, but when the second inputting mode is established, the control section controls the display section to execute display corresponding to the second inputting mode. With the portable information processing apparatus, automatic changeover between the first mode and the second mode can be carried out definitely.

Alternatively, the portable information processing apparatus may be configured such that the control section establishes a hand writing inputting mode when the tilting down movement of the display section is detected. With the portable information processing apparatus, changeover from the keyboard inputting mode to the hand writing inputting mode can be carried out automatically, and therefore, the operability is high.

The above and other features and advantages of the present embodiment will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
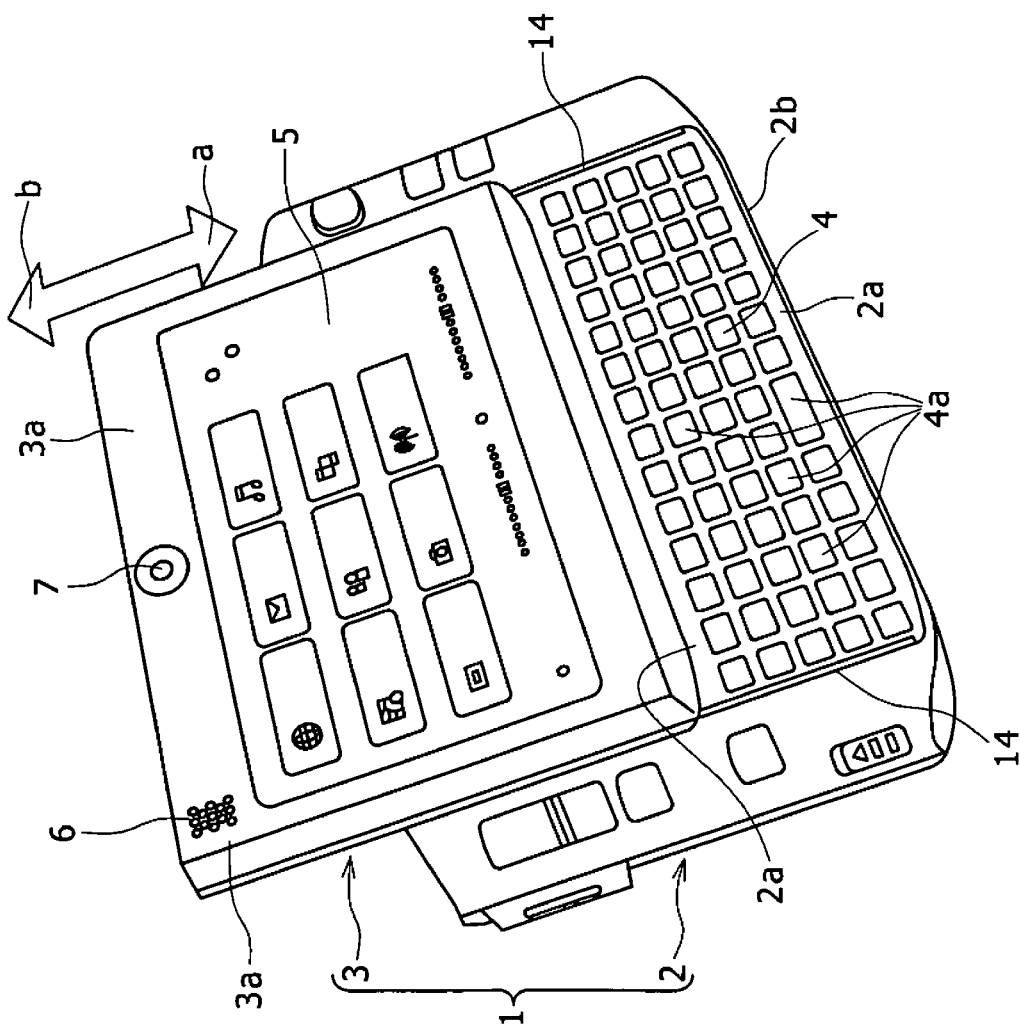
FIG. 1 is a perspective view of a portable information processing apparatus to which the present embodiment is applied.

A portable information processing apparatus according to a preferred embodiment of the present invention is described below with reference to the accompanying drawings.

The portable information processing apparatus is designed such that it is smaller in size than and superior in portability to a notebook type personal computer in that, while it is held by a hand of the user, an inputting operation to it such as a key inputting operation can be carried out readily by the user.

Referring first to FIGS. 1 to 7, the portable information processing apparatus 1 shown includes a body section 2 having a substantially flattened shape of a substantially rectangular outer profile, and a display section 3 placed horizontally at an upper portion of the body section 2 and having a substantially flattened shape of a substantially rectangular outer profile. The portable information processing apparatus 1 further includes a sub body section 11 incorporated in a rear portion of the body section 2 for allowing the body section 2 to tilt up and down.

A keyboard 4 having a large number of inputting keys 4a formed from touch buttons, pushbuttons and so forth is disposed on an upper face 2a of the body section 2.

A rectangular display member 5 formed from a liquid crystal display screen or the like is formed over an overall area of an upper face 3a of the display section 3. The display member 5 is formed as a touch inputting type display section, that is, as a tablet type display section, wherein the user directly touches with the display screen of the same to carry out inputting.

A microphone hole 6 and an image pickup mechanism 7 including an image pickup element, a lens and so forth are provided at an upper portion of the display member 5 on the upper face 3a of the display section 3.

A slide mechanism M1 is provided at an upper portion of the body section 2 for slidably moving the display section 3 in forward and backward horizontal directions indicated by arrow marks a and b, respectively, at the upper portion of the body section 2. A tilt-up and tilt-down mechanism M2 is provided at a rear position of another upper portion of the body section 2 for tilting up and down the display section 3 in upward and downward directions as indicated by arrow marks c and d, respectively.

A battery 8, a recording medium such as a hard disk or a flash memory, a main board and so forth not shown are accommodated in the inside of the body section 2. The battery 8 having particularly high weight is disposed at a position displaced to the front face side of the body section 2.

A display board not shown in the inside of the display section 3 is electrically connected to the main circuit and so forth in the inside of the body section 2 by the wiring mechanism 9 which is wired through an internal space 11b of the sub body section 11 hereinafter described. An antenna not shown for communication with various other information processing apparatus such as the Internet, a portable telephone set, a television set or a radio is built in the display section 3 or some other component.

A sensor SW1 serving as a first sensor for detecting a advanced position P1 of the display section 3 hereinafter described, a sensor SW2 serving as a second sensor for detecting tilt-up and tilt-down movements of the display section 3, a sensor SW3 serving as a third sensor for detecting a retracted position P2 of the display section 3 hereinafter described and some other sensor not shown are provided in the body section 2. The switches SW1, SW2 and SW3 are formed using a micro switch, a photo-sensor or a like element.

Now, the slide mechanism M1 and the tilt-up and tilt-down mechanism M2 are described with reference to FIGS. 3 to 6.

The sub body section 11 is accommodated at a position displaced to the rear end 2c side in the inside of the body section 2.

The sub body section 11 is mounted on the front end side thereof for pivotal motion at a position of the body section 2 displaced to the rear end 2c side by a pair of left and right fulcrum members 12. Thus, the sub body section 11 can be pivoted or swung in the directions indicated by arrow marks a and b, that is, in upward and downward directions, around the fulcrum members 12 with respect to the body section 2.

A pair of left and right slide guides 13 are formed at the opposite left and right side positions of the upper face 2a of the body section 2, respectively. The slide guides 13 are formed in parallel from guide grooves or the like having a substantially L-shaped cross section and having shapes symmetrical with each other in the leftward and rightward direction.

A pair of left and right slide guides 14 are formed also at the opposite left and right side positions of an upper face 11a of the sub body section 11, respectively. The slide guides 14 are formed from guide rails or the like having a substantially L-shaped cross section and having shapes symmetrical with each other in the leftward and rightward direction. The left and right slide guides 14 of the sub body section 11 are formed such that they extend linearly and removably connect to the rear end of the left and right slide guides 13 of the body section 2.

A pair of left and right slide guides 15 are formed in parallel to each other on the opposite left and right sides of a lower face 3b of the display section 3, respectively. The slide guides 15 are formed from guide rails or the like having a substantially L-shaped cross section and having shapes symmetrical with each other in the leftward and rightward direction. The left and right slide guides 15 can extend through the left and right slide guides 14 of the sub body section 11 until they are fitted into the left and right slide guides 13 of the body section 2, respectively.

Figure 3:
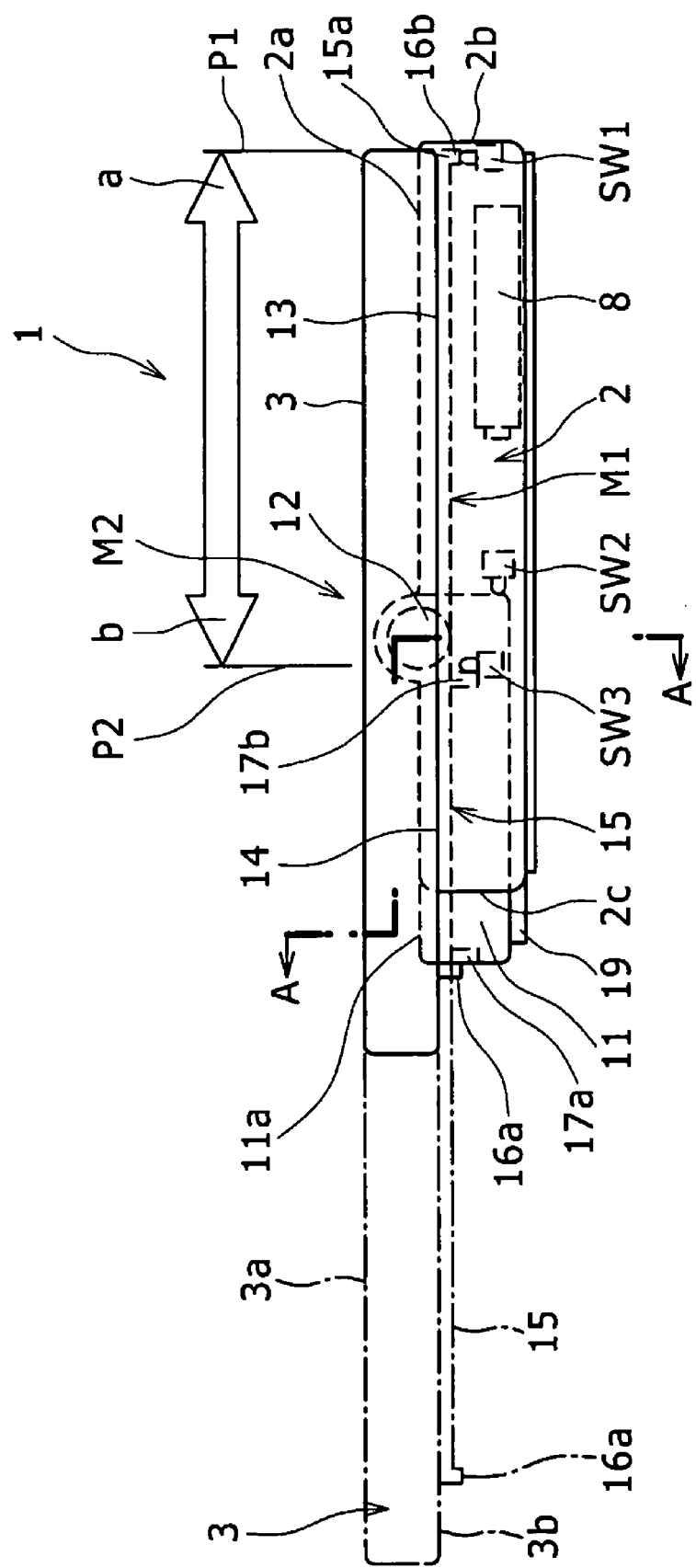
FIG. 3 is a side elevational view showing a slide mechanism and a tilt-up and tilt-down mechanism of the display section with respect to a body section of the portable information processing apparatus in a state wherein the display section is placed in an overlapping relationship on the body section.
Figure 4:
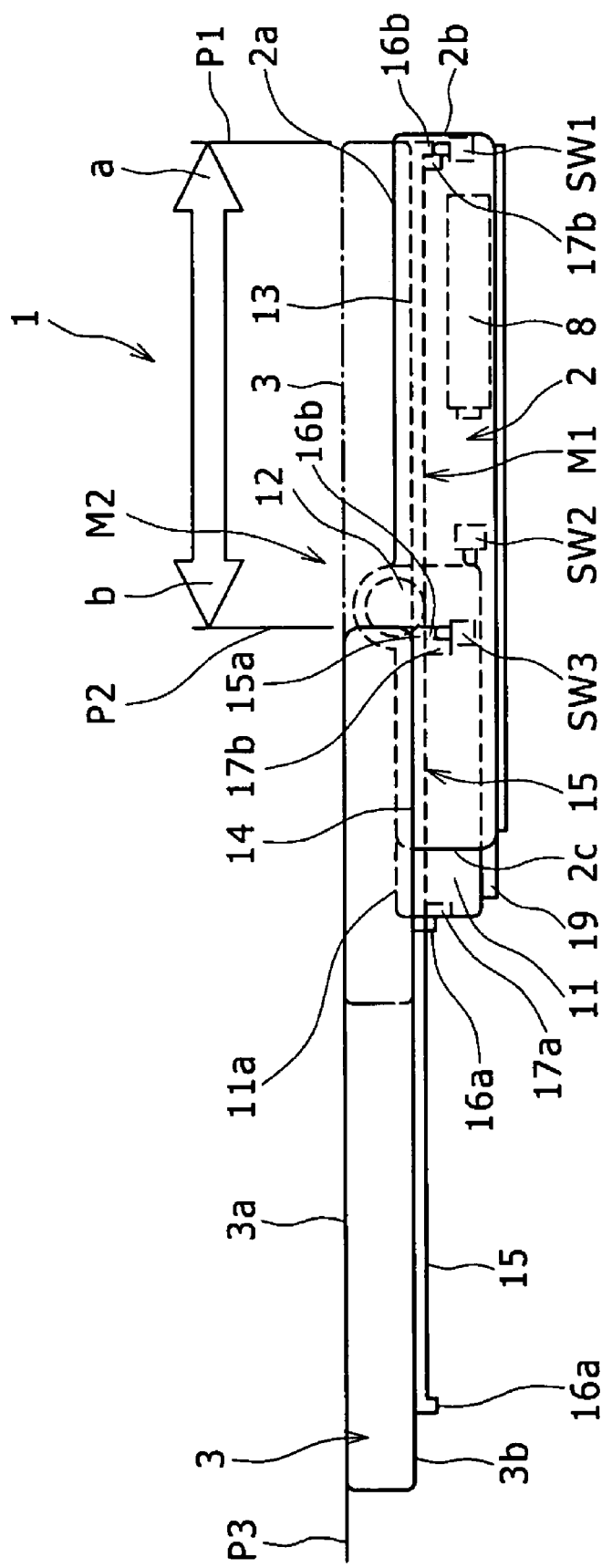
FIG. 4 is a side elevational view showing the slide mechanism and the tilt-up and tilt-down mechanism in another state wherein the display section is slidably moved to a tilt-down position at which it is displaced rearwardly with respect to the body section from the overlapping at which it is positioned on the body section.

The slide mechanism M1 slidably moves the display section 3 on the body section 2 in the directions indicated by arrow marks a and b in FIGS. 3 and 4 between the advanced position P1 which is a first position indicated by solid lines in FIG. 3 and indicated by alternate long and short dash lines in FIG. 4 and the retracted position P2 which is a second position indicated by alternate long and short dash lines in FIG. 3 and indicated by solid lines in FIG. 4. The slide mechanism M1 is composed of the left and right slide guides 13 and 14 and slide guides 15 paired with each other.

For example, a pair of front and rear stops 16a and 16b are formed integrally at a lower portion of the opposite end portions in the directions of the arrow marks a and b of each of the left and right slide guides 15 of the display section 3. The pairs of the front and rear stops 16a and 16b project downwardly through the slide guides 13a and 14a formed in bottom portions of the left and right slide guides 13 and 14 of the sub body section 11 of the body section 2, respectively.

A pair of left and right stops 17a and 17b are provided in the body section 2 and the sub body section 11 for defining the movement positions of the front and rear stops 16a and 16b of the display section 3 in the directions of the arrow marks a and b.

In FIG. 4, it is indicated by solid lines that end portions of the left and right slide guides 15 of the display section 3 in the direction of the arrow mark a are removed from the left and right slide guides 13 of the body section 2 in the direction of the arrow mark b and the stops 16b of the left and right slide guides 15 in the direction of the arrow mark a are abutted with the left and right stops 17b of the sub body section 11 in the direction of the arrow mark b. Consequently, the display section 3 is held on the sub body section 11 by the end portions of the left and right slide guides 15 in the direction of the arrow mark a.

Figure 5:
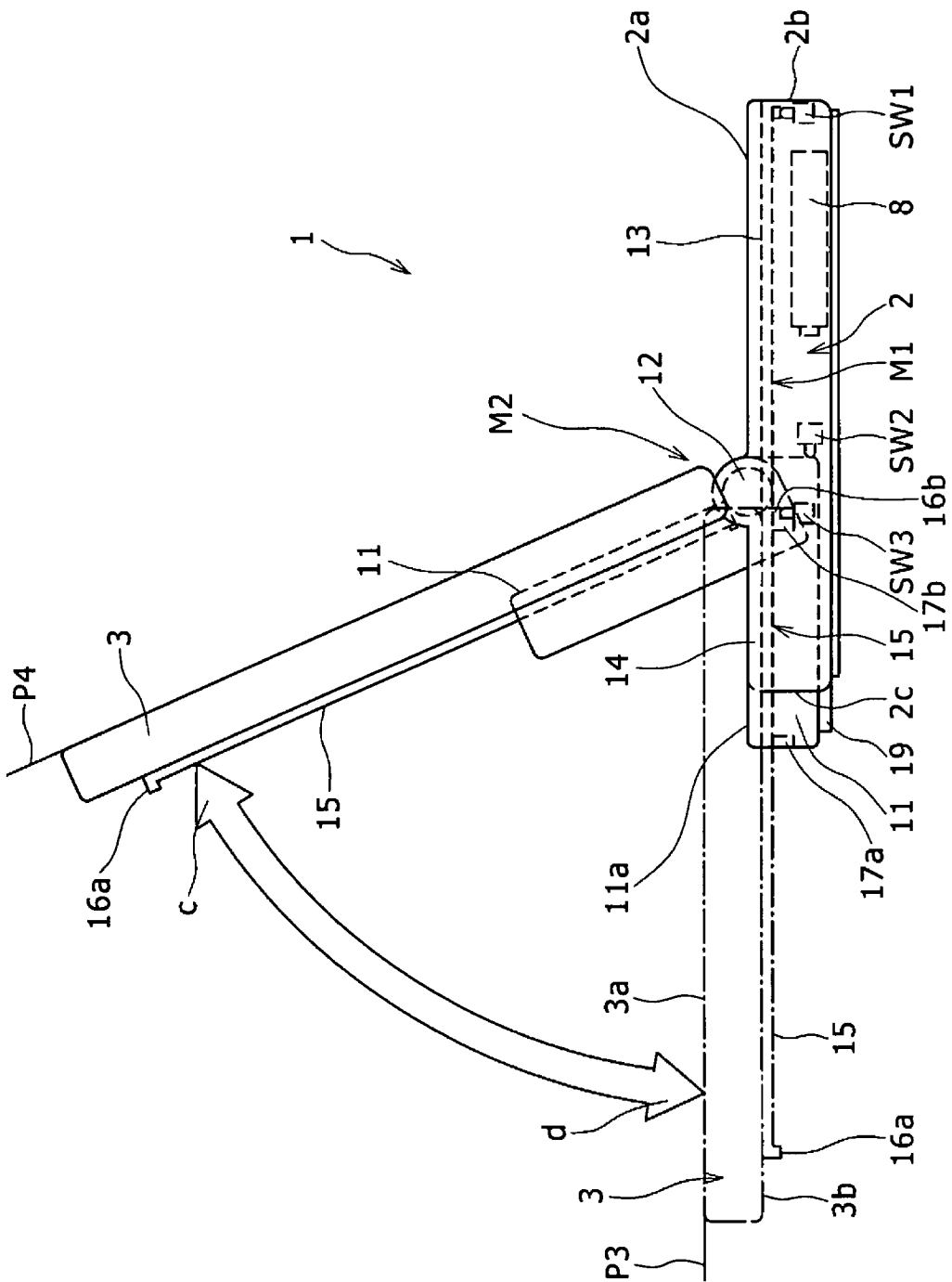
FIG. 5 is a side elevational view showing the slide mechanism and the tilt-up and tilt-down mechanism in a further state wherein the display section is tilted up to a tilt-up position at which it is tilted up with respect to the body section from the tilt-down position.
Figure 6:
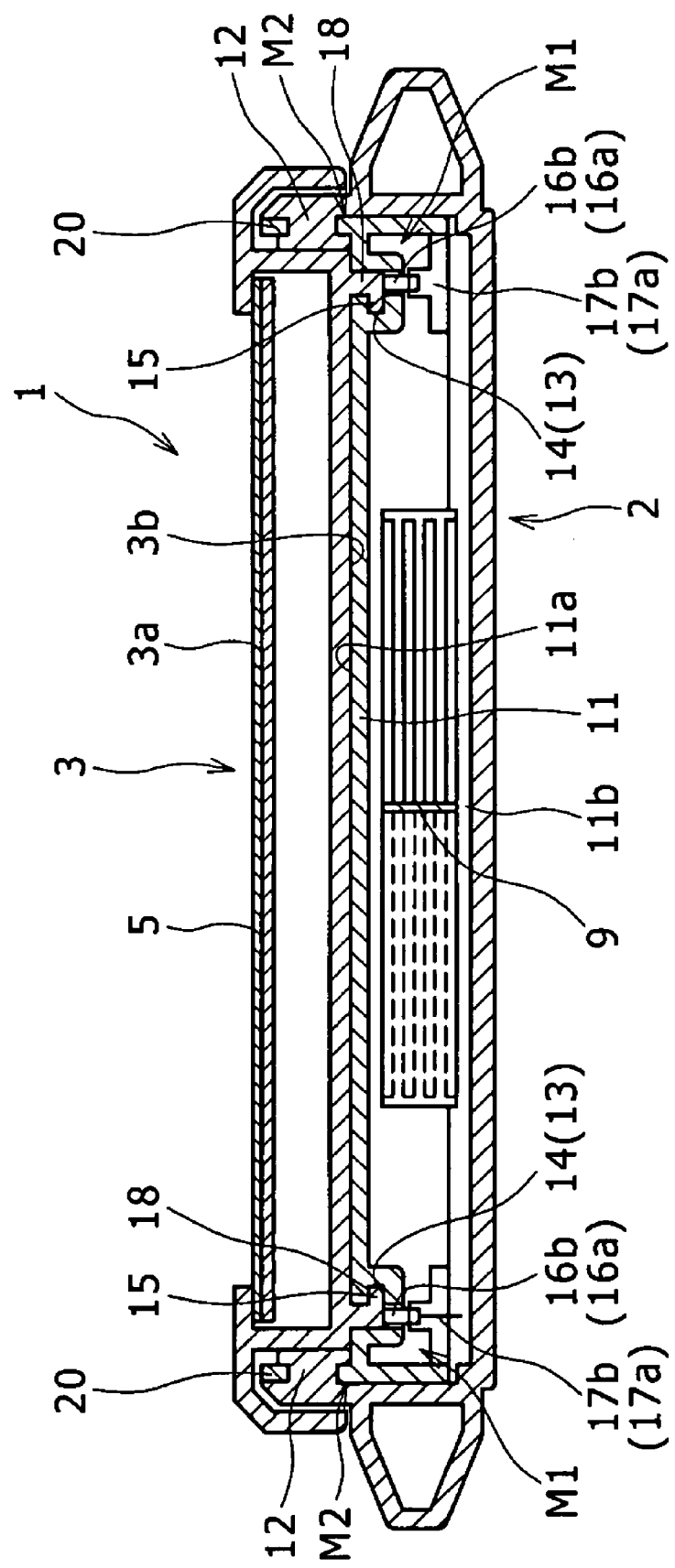
FIG. 6 is an enlarged sectional view taken along line A-A of FIG. 3.
Figure 7:
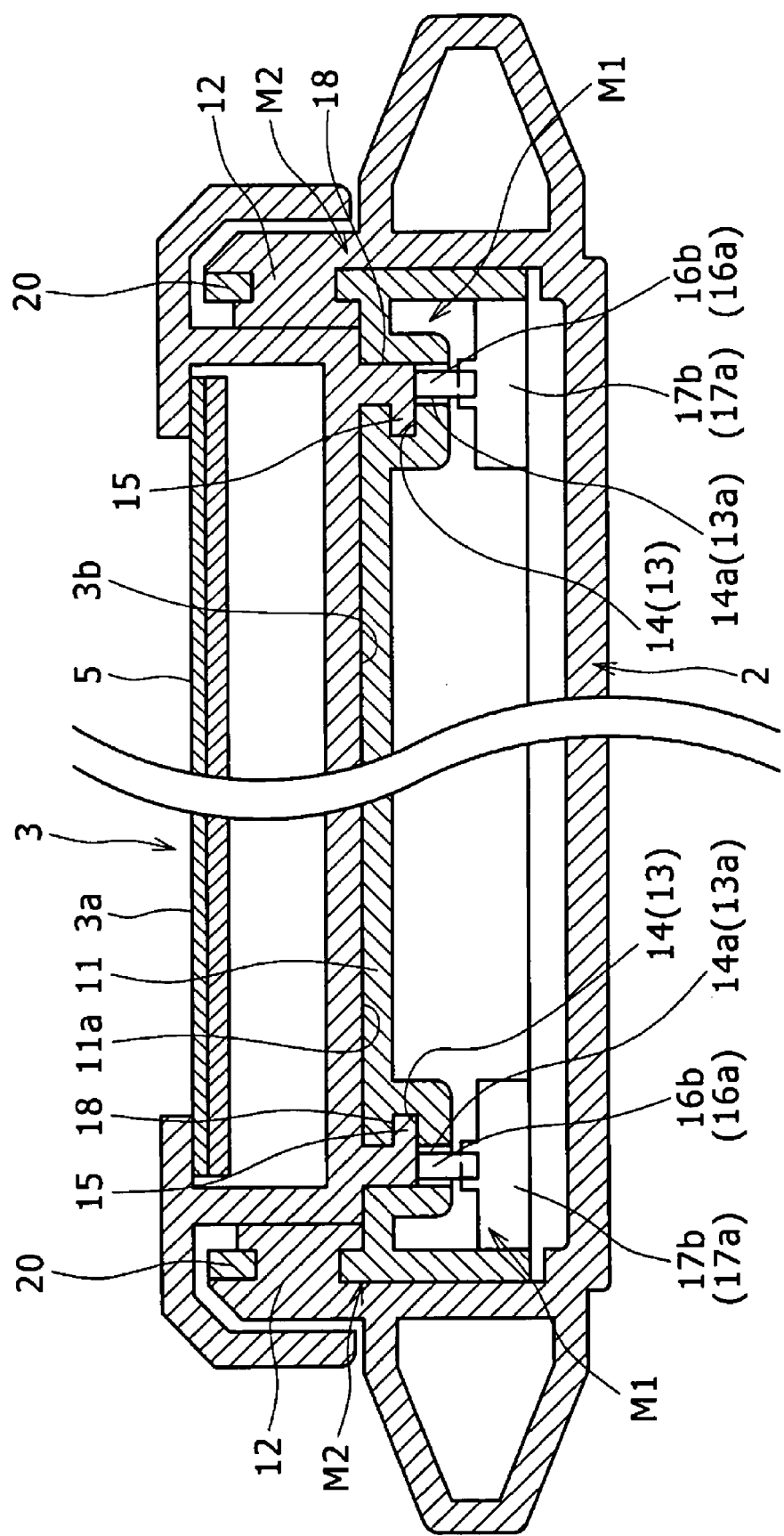
FIG. 7 is a sectional view partly broken showing, in an enlarged scale, a structure of a pair of left and right slide guides shown in FIG. 6.

The tilt-up and tilt-down mechanism M2 is configured to tilt up and down the display section 3 at the retracted position P2 shown in FIG. 4 integrally with the sub body section 11 within an angle of approximately 90° in the directions indicated by arrow marks c and d between a tilt-down position P3 which is indicated by solid lines in FIG. 4 and is a horizontal retracted position indicated by alternate long and short dash lines in FIG. 5 and an upwardly erected tilt-up position P4 indicated by solid lines in FIG. 5 around the fulcrum members 12 with respect to the body section 2.

A wiring mechanism 9 such as a belt-shaped flexible wiring line board is wired between the body section 2 and the display section 3 through the internal space 11b of the sub body section 11 such that it has a length sufficient to allow a sliding movement and a tilt-up and tilt-down movement hereinafter described of the portable information processing apparatus 1 with respect to the body section 2 by the slide mechanism M1 and the tilt-up and tilt-down mechanism M2.

According to the slide mechanism M1 and the tilt-up and tilt-down mechanism M2 configured in such a manner as described above, when the display section 3 is at the advanced position or first position P1 at which the display section 3 covers over the body section 2 as indicated by solid lines in FIG. 3, the left and right slide guides 15 of the display section 3 extend through the left and right slide guides 14 of the sub body section 11 into the left and right slide guides 13 of the body section 2.

Then, the left and right stops 16a of the lower face 3b of the display section 3 are abutted with the left and right stops 17a of the sub body section 11 or the like in the direction indicated by the arrow mark a to position the display section 3 at the advanced position P1. Further, that the display section 3 is positioned at the advanced position P1 is detected by the sensor SW1 provided in the body section 2 and the power supply is controlled to an off state.

At this time, the display section 3 is positioned by a pair of friction structure sections 18 between the left and right slide guides 13 and 14 and the left and right slide guides 15 or the like. It is to be noted that the friction structure sections 18 can be replaced by mechanical positioning mechanisms not shown or the like.

It is to be noted that, when the sub body section 11 which is swung in the directions indicated by the arrow marks c and d which are upward and downward directions around the fulcrum members 12 is pivoted back in the direction indicated by the arrow mark d which is the downward direction, it is abutted with a stop 19 provided on the bottom of the body section 2 and assumes a horizontal position.

When the sub body section 11 is positioned horizontally, the left and right slide guides 15 of the sub body section 11 are horizontally and removably connected to rear ends of the horizontal left and right slide guides 13 of the body section 2.

Then, if the display section 3 is slidably moved in the direction indicated by the arrow mark b as indicated by solid lines in FIG. 4 from the advanced position or first position P1 to the retracted position or second position P2 and the tilt-down position P3, then the sensor SW3 is turned on. Consequently, the power supply is turned on, and the operation mode of the portable information processing apparatus 1 is changed over, for example, from a keyboard inputting mode in which the keyboard 4 is used for inputting to a hand writing inputting mode in which a touch pen is used for inputting or the like. In other words, selection of an inputting method is carried out.

Then, the keyboard 4 and so forth on the upper face 2a of the body section 2 are all exposed or opened.

At this time, the left and right slide guides 15 of the display section 3 are pulled out from the left and right slide guides 13 of the display section 3 in the direction indicated by the arrow mark b and held into the left and right slide guides 14 of the sub body section 11.

Then, the left and right stops 16b of the lower face 13b of the display section 3 are abutted with the left and right stops 17b of the sub body section 11 in the direction indicated by the arrow mark b to position the display section 3 at the retracted position P2.

Further, at this time, the sensor SW1 in the body section 2 is turned off while the sensor SW3 in the direction indicated by the arrow mark b in the display section 3 is turned on by the display section 3 to detect the retracted position P2 of the display section 3.

Also at this time, the display section 3 is positioned at the retracted position P2 by the friction structure sections 18 between the left and right slide guides 14 and the left and right slide guides 15 or the mechanical positioning mechanisms not shown.

Then, when the display section 3 is slidably moved to the retracted position P2 and the tilt-down position P3 indicated by solid lines in FIG. 4 and indicated by alternate long and short dash lines in FIG. 5, the display section 3 can be angularly upwardly adjusted freely to an arbitrary tilt-up position or third position P4, which is within a range of substantially 90° upwardly from the horizontal position, within a range of approximately 90° in the direction indicated by the arrow marks c and b as indicated by solid lines in FIG. 5.

At this time, since the left and right slide guides 15 of the display section 3 are held at portions thereof in the direction indicated by the arrow mark a in the left and right slide guides 14 of the sub body section 11 by the friction structure sections 18, it is possible to pivotally move or swing the display section 3 steplessly or stepwise in the directions indicated by the arrow marks c and d around the left and right fulcrum members 12 integrally with the sub body section 11 to set the display section 3 to an erected position, that is, to the third position, within the range of substantially 90°.

Also at this time, the display section 3 is positioned at an arbitrary position in the directions indicated by the arrow marks c and d by friction mechanisms 20 of the sub body section 11 or the multi-stage mechanical positioning mechanisms (not shown) with respect to the body section 2 around the left and right fulcrum members 12.

Then, if the display section 3 is pivoted in the direction indicated the arrow mark c upwardly around the fulcrum members 12, then the sensor SW3 in the body section 2 is turned off while the sensor SW2 in the body section 2 is turned on to detect that the display section 3 is tilted up.

Then, in response to the turning on of the sensor SW2, input changeover, for example, from the hand writing inputting mode by the touch pen to the keyboard inputting mode in which the keyboard 4 is used or to some other mode, that is, selection of an inputting method, is automatically carried out.

It is to be noted that, in order to store the portable information processing apparatus 1, the display section 3 is first pivoted or folded in the direction indicated by the arrow mark d from the tilt-up position indicated by solid lines in FIG. 5 to the retracted position P2 or horizontal position indicated by solid lines in FIG. 4 around the left and right fulcrum members 12. Then, the display section 3 is slidably moved in the direction indicated by the arrow mark a to the advanced position Pi indicated by solid lines in FIG. 3 along the left and right slide guides 13, 14 and 15 until the display section 3 covers over the body section 2, whereupon the two sensors SW1 and SW2 are turned on and off, respectively, to turn off the power supply.

According to the portable information processing apparatus 1 having the configuration described above, when the portable information processing apparatus 1 is placed at the bottom face 3c of the display section 3 thereof on a desk and used in this state, if the display section 3 is used in a state wherein it is slidably moved to a rear portion of the body section 2, then the operability when the user uses the touch pen to carry out such an operation as inputting to the display member 5 of the display section 3 or the like as hereinafter described is good.

Thereupon, if the battery 8 having comparatively high weight is provided at a position displaced toward the front face 2b in the opposite direction to the sliding direction of the body section 2 to the retracted position P2 as seen in FIGS. 3 to 5, then when the user carries out an inputting operation to the display member 5 of the display section 3 using the touch pen, the front face 2b side of the display section 3 is less likely to move upwardly like a seesaw. Thus, the operability of the touch pen inputting operability is improved.

On the other hand, when the user holds by hand and uses the portable information processing apparatus 1, the portable information processing apparatus 1 is used in a state wherein the display section 3 is erected in the direction indicated the arrow mark c at the rear position of the display section 3. By this, the visual observability of the display member 5 is assured.

Figure 2:
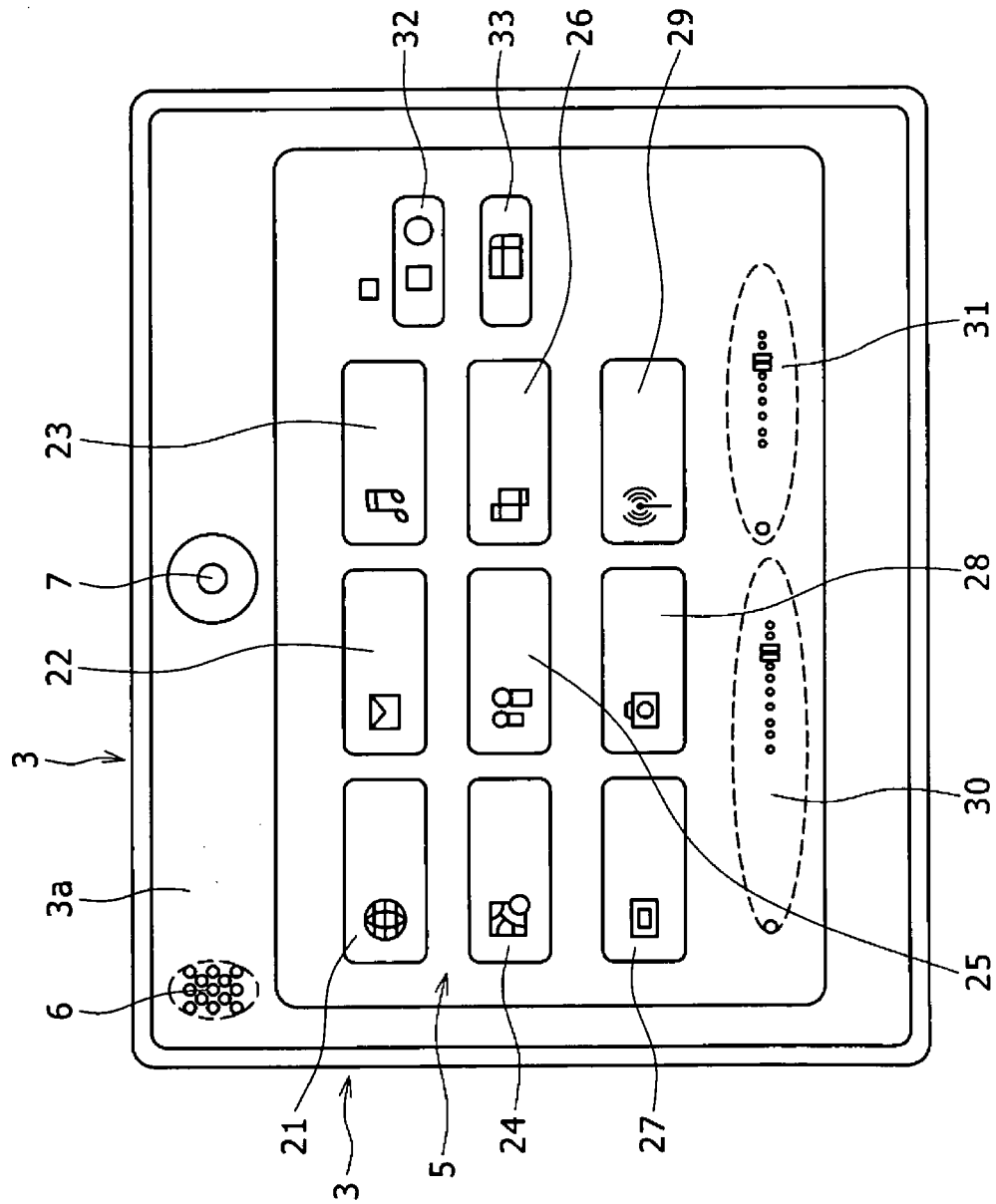
FIG. 2 is a plan view showing an example of a display screen of a display section of the portable information processing apparatus.

FIG. 2 shows an example of an application for inputting to the display member 5 of the portable information processing apparatus 1 using the touch pen. Referring to FIG. 2, the display member 5 includes an internet SW (switch) 21 which is a touch switch for starting up a web browser and establishing a connection to the Internet, a mail SW 22 which is a touch switch for starting up a mail application, and a music SW 23 which is a touch switch for starting up an application for music reproduction, disposed in order from the left in an uppermost row.

In a second row in FIG. 2, a map SW 24 which is a touch switch for starting up a map displaying application, a communication SW 25 which is a touch switch for starting up an instant messenger by which chatting, file transfer and so forth can be carried out and a my document SW 26 which is a touch switch for displaying an image for referring to a file in a my document folder are disposed in order from the left.

In a third row in FIG. 2, a communication SW 27 which is a touch switch for starting up an instant messenger which is an application by which chatting, file transfer and so forth can be carried out, a camera SW 28 for starting up an image pickup application and a wireless connection setting SW 29 which is a touch switch for displaying a setting screen image for setting an apparatus to be connected by wireless connection are disposed in order from the left.

In a lowermost row in FIG. 2, a touch switch 30 for a GUI for musical adjustment and a touch switch 31 for a GUI for changing the brightness of the liquid crystal screen are disposed in order from the left. On the right side of the switches mentioned above, a touch switch 32 for a GUI for external display output changeover and a touch switch 33 for a GUI for changing over between vertical and horizontal displaying manners of the screen are disposed in order from above.

The portable information processing apparatus 1 of the present embodiment incorporates first and second operating systems. The first operating system may be, for example, the Linux. The Linux has a characteristic that it operates lightly also on a computer having a low performance in comparison with other operating systems.

Meanwhile, for example, the Windows Vista (registered trademark) is used for the second operating system.

Figure 8:
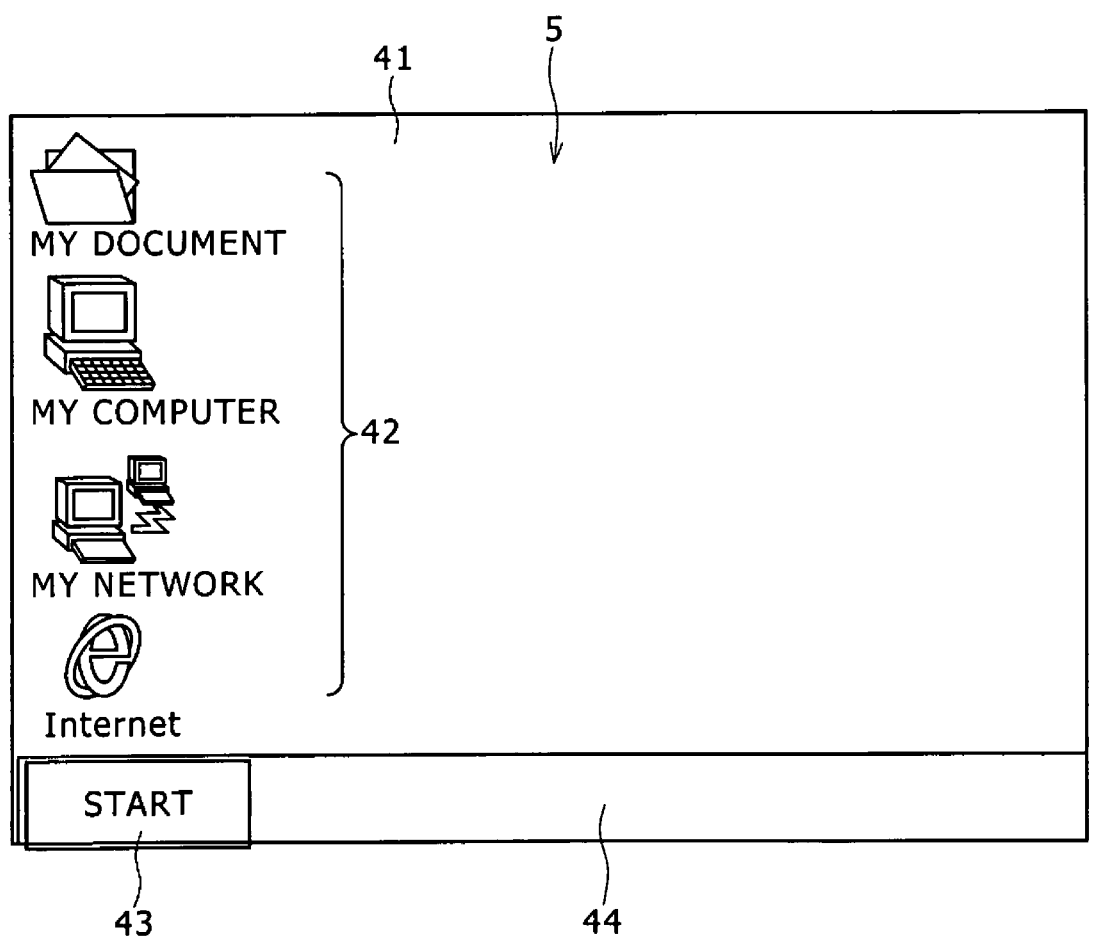
FIG. 8 is a front elevational view showing a build up screen image for the Internet on the display screen of the portable information processing apparatus.

FIG. 8 shows a display screen image 41 displayed on the display member 5 after the second operating system represented, for example, by the Windows Vista (registered trademark) is started up.

Here, the starting up time of the second operating system is shorter than the starting up time of the first operating system. In other words, the second operating system demands a longer period of time for starting up thereof.

The display screen image 41 of FIG. 8 displays a large number of known shortcut icons 42 for my document, my computer, my network, Internet and so forth, a task bar 44 having a start button 43 and so forth.

Figure 9:
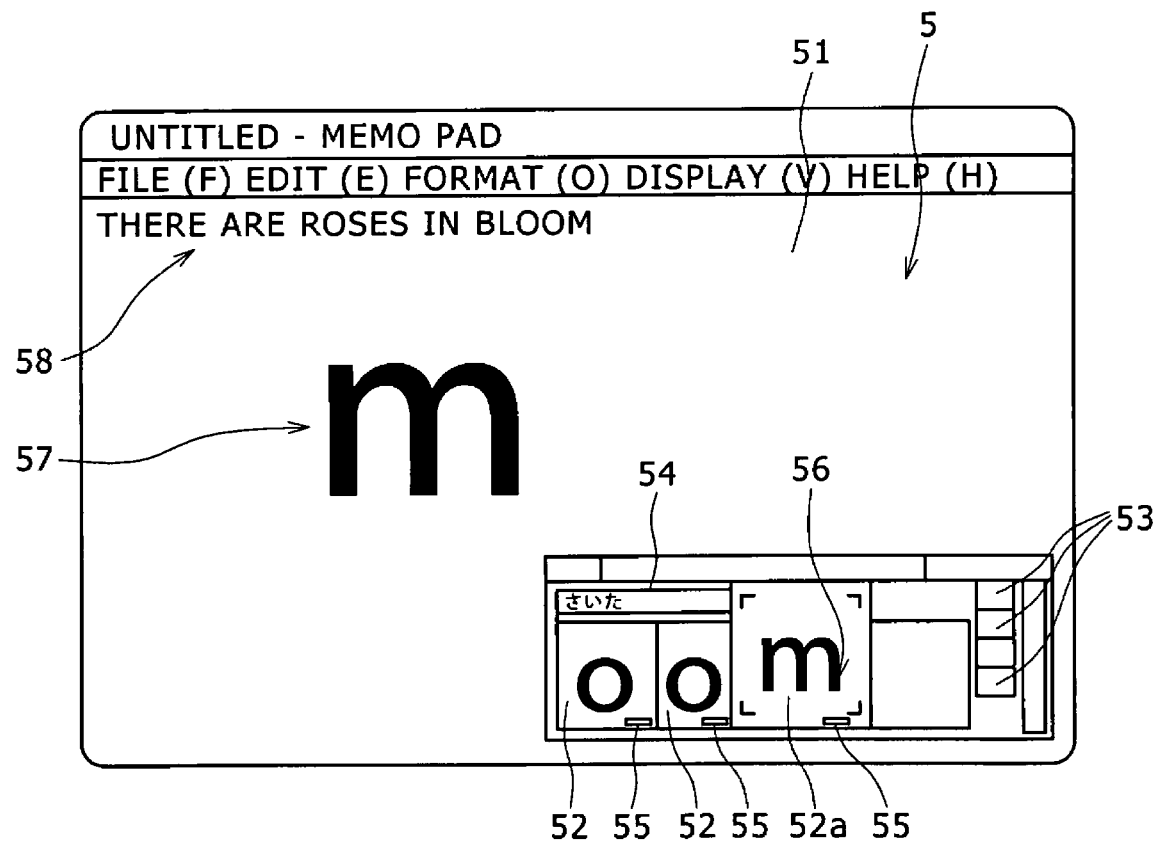
FIG. 9 is a front elevational view showing a screen image for hand writing inputting for the Internet on the display screen of the portable information processing apparatus.

FIG. 9 shows a virtual inputting screen image 51 for hand writing inputting by a touch pen displayed on the display member 5 and is a screen image of a memo application executed as a hand writing inputting mode on the first operating system. Accordingly, for example, when it is desired to take notes immediately or in a like case, execution of the memory application on the first operating system which is started up in comparatively short time achieves enhancement of the convenience. Above all, in a state wherein the portable information processing apparatus 1 is held, hand writing inputting by a touch pen is convenient.

At a lower position or some other position of the virtual inputting screen image 51, a plurality of inputting frame regions 52, a plurality of processing buttons 53 for executing a predetermined process, a display portion 54 in which characters inputted are displayed and so forth are displayed. Further, a conversion key 55 is displayed at a lower end in each of the inputting frame regions 52.

The inputting frame regions 52 are produced as data, for example, of the bitmap type (CBitmapButton), and detection regarding an inputting frame region 52 is carried out using a "WM_MOUSEMOVE" message (detection step). A pointer 56 is moved into an inputting frame region 52, and when the coordinate value of the pointer 56 becomes equal to a value included in a coordinate value in the inputting frame region 52 based on an "ON_WM_MOUSEMOVE" message outputted then, the bitmap image display of the inputting frame region 52 is converted and an active state is entered.

Accordingly, a displaying controlling step at which the inputting frame region 52a is made greater in size than the object inputting frame region 52 is provided.

Therefore, when the user uses the touch pen to carry out hand writing inputting to the virtual inputting screen image 51, for example, if the user tries to input characters "bloom", then if the characters "b," "l," "o," "o" and "m" begin to be successively inputted to an inputting region 57, then a "WM_LBUTTONDOWN" message is outputted.

FIG. 9 illustrates that "m" is inputted, and during inputting of the characters, a WM_MOUSEMOVE message is outputted in response to the movement of the pointer 56.

If the hand writing inputting ends and the outputting of the WM_MOUSEMOVE message is stopped for a fixed period of time, then the screen display mode changes over to a type display mode and a typeface conversion is carried out. Consequently, typeface characters 58 of "There are roses in bloom" as a result of the conversion are displayed at a left upper portion or some other portion of the virtual inputting screen image 51.

Here, controlling operation of the portable information processing apparatus 1 having the configuration described above in response to the position and the tilted state of the display section 3 is described.

Figure 10:
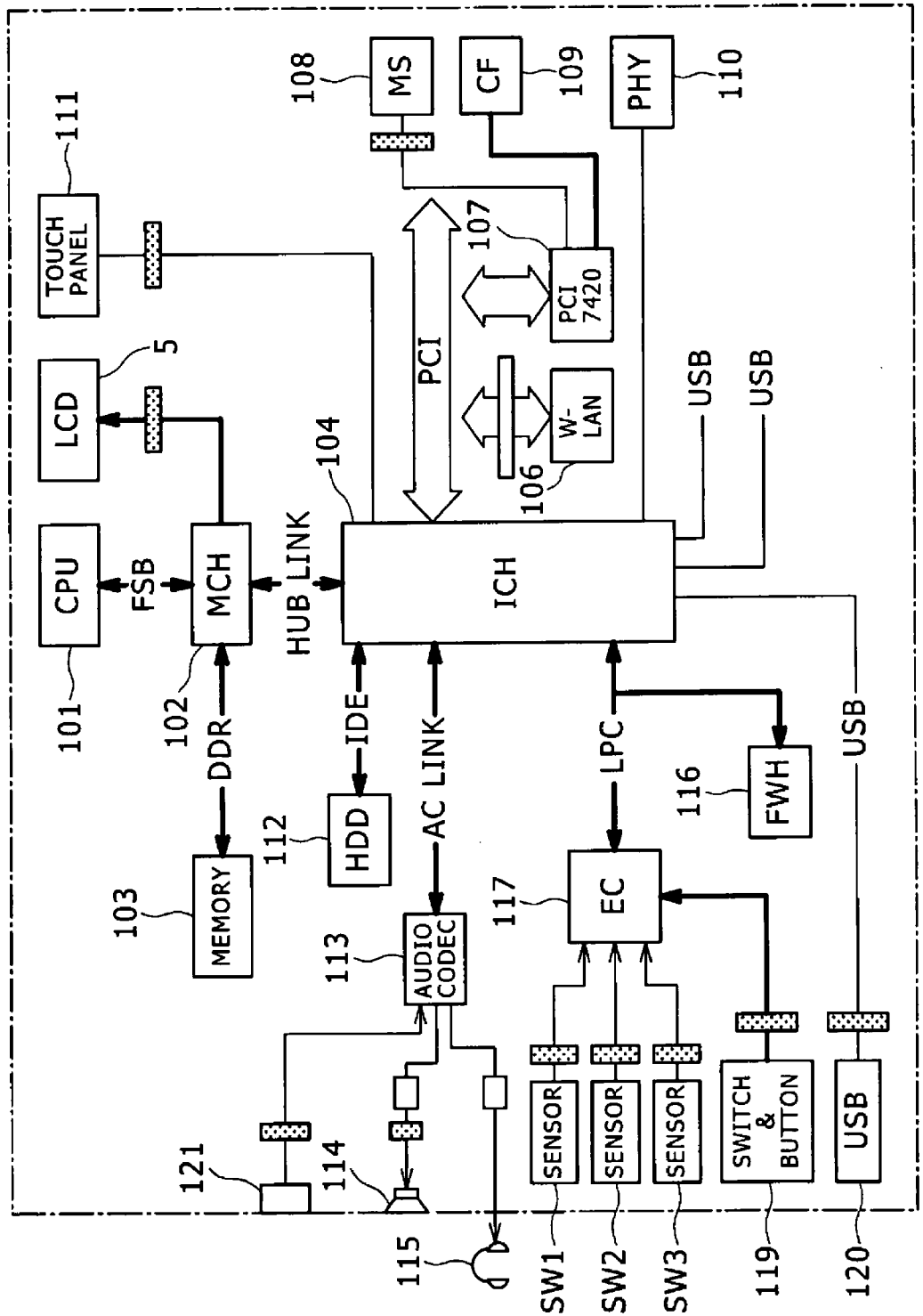
FIG. 10 is a block diagram showing an internal hardware configuration of the portable information processing apparatus.

First, an internal hardware configuration of the portable information processing apparatus 1 is described with reference to FIG. 10.

A CPU 101 serving as a control center is connected to a control section 102 through a bus (FSB: Front Side Bus). The control section 102 cooperates with another control section and several devices hereinafter described to form mathematical operation processing mechanism. The control section 102 takes charge of control of a main memory 103 and control relating to a graphic function and has a role principally of processing a large amount of data at a high speed. To the control section 102 in the present embodiment which is called "north bridge" in an AT (automatic transmission) compatible machine, the CPU 101, the main memory 103, a control section 104 and a display member 5 such as the liquid crystal display device described hereinabove are connected.

The control section 104 principally controls control devices for a user interface and so forth and carries out bus linking and so forth of the devices. The control section 104 is called "south bridge" in an AT compatible machine and has a role, in the "PCI to ISA bridge," of bridging a bus "PCI: Peripheral Component Interconnect bus" to a low speed bus (ISA: Industry Standard Architecture bus) or the like and has a function of an ISA controller, an IDE (Integrated Drive Electronics) controller or the like.

To the bus (PCI bus), a wireless LAN (W-LAN) as a wireless communication device 106 and a device 107 for carrying out connection to or control of an external memory or an external apparatus are connected. As the external memory, a semiconductor memory device which can be removably mounted on the apparatus body section such as, for example, a controlling device 108 for writing and reading out data into and from a stick type storage medium or a controlling device 109 for a card type storage medium or the like is provided. The device 107 defines a function of an interface for connection to an external apparatus such as, for example, "IEEE 1394" which defines specifications of hardware for adding a serial device to a computer.

A LAN (Local Area Network) connecting device 110 is connected to the control section 104.

A touch panel 111 is formed on the display member 5 such that input information through the touch panel 111 is inputted to the control section 104 to carry out hand writing inputting by the touch pen described above.

While a drive apparatus which uses, for example, a magnetic disk or an optical disk is used as an auxiliary storage section 112, in the present embodiment, a drive apparatus which uses a large capacity storage medium such as a hard disk is used and connected to (an IDE (integrated drive electronics) controller of) the control section 104.

An audio signal processing section (Audio Codec) 113 connected to the control section 104 signals an audio signal after digital-analog information, for example, to a speaker 114 or a headphone 115 to output sound.

A sound input from a microphone 121 is digitized by the audio signal processing section 113.

A control program for causing a computer to operate and so forth are stored in a storage section 116. The storage section 116 is connected to the control sections 104 and 117 using an LPC (Low Pin Connect: serial bus) or the like.

The control section 117 is a general purpose apparatus which controls various signals, and, for example, an "EC" (Embedded Controller) is used for the control section 117 and controls in regard to a function of a keyboard controller, the power supply of the system, an additional function of the system and so forth. In a portable apparatus like the portable information processing apparatus 1 of the present embodiment, a microcomputer may be incorporated. It is to be noted that the controlling method of the computer can be changed by changing the control program in the storage section 116.

A signal from an operation section 119 including a plurality of operation elements provided on the apparatus body section such as the keyboard 4 is signaled to the control section 117.

Further, detection signals from the switches SW1, SW2 and SW3 described hereinabove are signaled to the control section 117.

A USB (Universal Serial Bus) connector is provided as a connection section 120 for directly connecting an external apparatus to the apparatus body section. The USB connector is connected to the control section 104.

A first processing example as an example of a process carried out in response to the state of the slide mechanism M1 and the tilt-up and tilt-down mechanism M2 by the portable information processing apparatus 1 having the configuration described above is described with reference to FIG. 11 as well as FIGS. 1 to 7 and 10.

This is a processing example of a mode changeover function of the first operating system changed over in response to the position and the tilted state of the display section 3.

Figure 11:
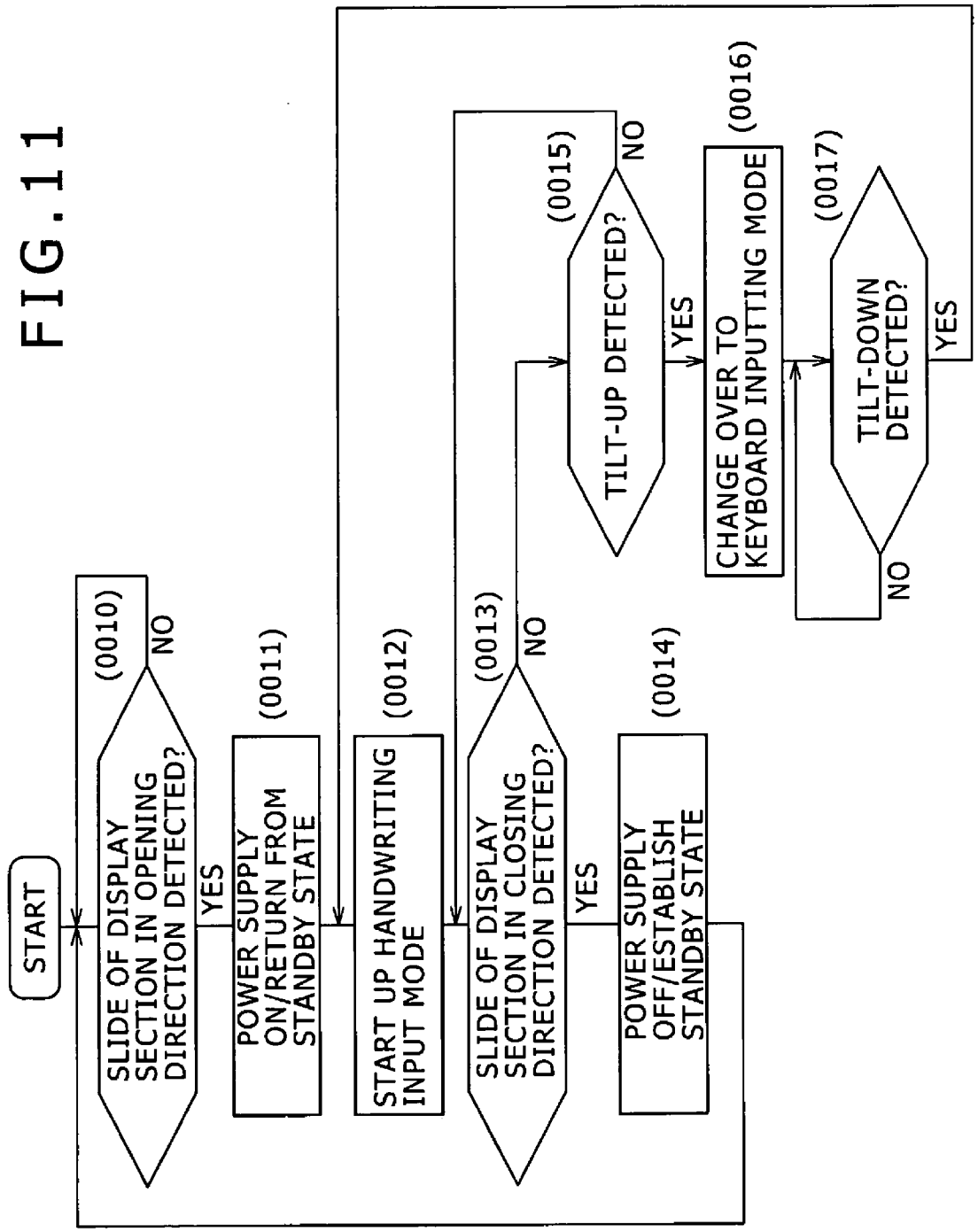
FIGS. 11, 12 and 13 are flow charts illustrating different examples 1 to 3 of controlling software of the portable information processing apparatus.

The CPU 101 of the portable information processing apparatus 1 detects the state of the switches SW1, SW2 and SW3 detected by the control section 117 and carries out the process of FIG. 11.

When the end portion of the display section 3 is at the advanced position P1 and the power supply is in an off state or the first operating system is in a standby state, the CPU 101 decides at step 0010 after every predetermined interval of time whether or not the display section 3 is slidably moved in the opening direction with respect to the body section 2, that is, in the direction indicated by the arrow mark b.

The control section 117 normally supervises the state of the switches SW1, SW2 and SW3 and decides the position of the display section 3 with respect to the display section 3 or the state of a sliding operation or a tilting operation in response to an on signal or an off signal from the switches SW1, SW2 and SW3 and then transmits the detected states to the CPU 101. Then, if the control section 117 detects a sliding movement of the display section 3 in the opening direction from an off signal of the sensor SW1 and an on signal of the sensor SW3, then it issues a notification of this to the CPU 101.

If the CPU 101 detects a sliding movement of the display section 3 in the opening direction based on the notification from the control section 117, then it advances the processing from step 0010 to step 0011.

At step 0011, the CPU 101 carries out control of a power supply on state or returning control from a standby state. Then, following the startup of the first operating system (hereinafter referred to as OS) or the returning from the standby state, the CPU 101 starts up the memo application executed as a hand writing inputting mode at step 0012.

At steps 0013 and 0015, the CPU 101 supervises the state of the display section 3 based on a notification from the control section 117.

If the control section 117 recognizes from an on signal of the sensor SW2 that the display section 3 is tilted up, then it issues a notification of this to the CPU 101. Consequently, the CPU 101 detects the tilt-up movement of the display section 3 at step 0015. In this instance, the CPU 101 advances the processing to step 0016, at which it carries out a changeover process to the keyboard inputting mode. In the keyboard inputting mode, inputting through the keyboard 4 is carried out.

After the keyboard inputting mode is established, the CPU 101 supervises the tilt-down at step 0017.

The CPU 101 recognizes from an off signal of the sensor SW2 and an on signal of the sensor SW3 that the display section 3 is tilted down, that is, the display section 3 is positioned at the retracted position P2, and notifies the CPU 101 of this.

When the CPU 101 detects the tilt-down of the display section 3 based on the notification from the control section 117, it returns the processing to step 0012, at which it starts up the hand writing inputting mode. After the hand writing inputting mode is restored, the CPU 101 supervises the state of the display section 3 at steps 0013 and 0015 again.

If the control section 117 detects, in a state wherein the display section 3 is at the retracted position P2 and is in the hand writing inputting mode, from an off signal of the sensor SW3 and an on signal of the sensor SW1, that the display section 3 is slidably moved in the closing direction, that is, slidably moved to the advanced position P1, then it notifies the CPU 101 of this.

When the CPU 101 detects based on the notification from the control section 117 that the display section 3 is slidably moved in the closing direction, it advances the processing from step 0013 to step 0014, at which it carries out power supply off control or a changing process to a standby state. Consequently, the portable information processing apparatus 1 is placed into a power off state or a standby state.

Through the process described above with reference to FIG. 11, when the display section 3 is slidably moved in the opening direction, the first operating system is started up or restored in the portable information processing apparatus 1, and the portable information processing apparatus 1 enters the hand writing inputting mode. In other words, the portable information processing apparatus 1 is placed into a state wherein the user can input information by hand writing inputting.

Further, if the user tilts up the display section 3, then the portable information processing apparatus 1 is automatically placed into the keyboard inputting mode, in which inputting using the keyboard 4 is permitted.

On the other hand, if the user tilts down the display section 3, then the portable information processing apparatus 1 is placed back into the hand writing inputting mode. If the display section 3 is slidably moved further to the closed position, then the power supply is turned off or a standby state is established.

Now, a second example of a process of the portable information processing apparatus 1 is described with reference to FIG. 12.

Figure 12:
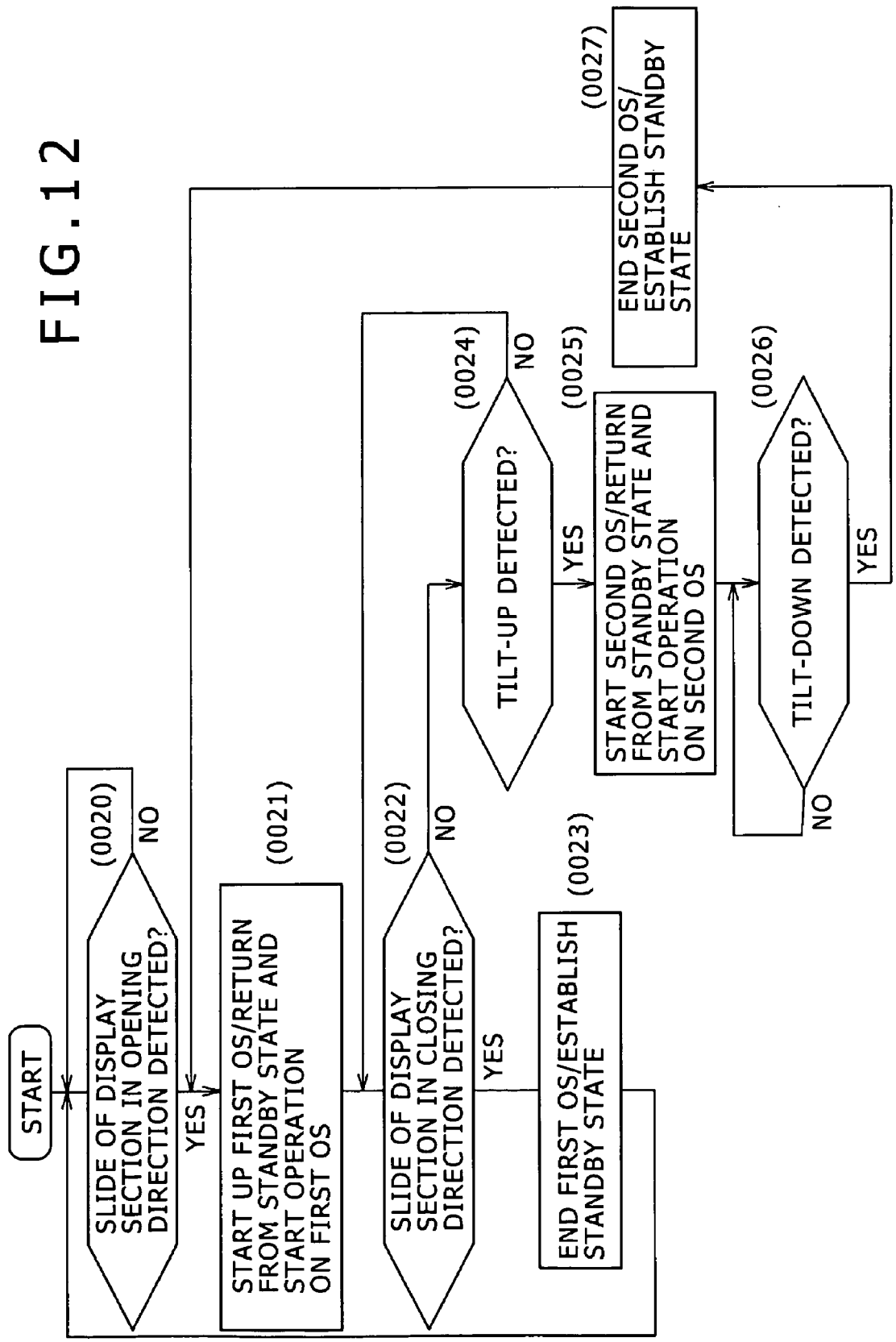

The CPU 101 of the portable information processing apparatus 1 carries out the process of FIG. 12 in response to the state of the switches SW1, SW2 and SW3 detected by the control section 117.

When the end portion of the display section 3 is at the advanced position P1, the CPU 101 decides at step 0020 after each predetermined interval of time whether or not the display section 3 is slidably moved in the opening direction with respect to the body section 2, that is, in the direction indicated by the arrow mark b.

The control section 117 normally supervises the state of the switches SW1, SW2 and SW3 and decides the position or the state of a sliding movement or a tilting movement of the display section 3 with respect to the body section 2 and then transmits the decided state to the CPU 101. Then, if the control section 117 detects a sliding movement of the display section 3 in the opening direction from an off signal of the sensor SW1 and an on signal of the sensor SW3, then it issues a notification of this to the CPU 101.

The CPU 101 detects the sliding movement of the display section 3 in the opening direction based on the notification from the control section 117 and advances the processing from step 0020 to step 0021.

At step 0021, the CPU 101 carries out starting up of the first operating system or a returning process from a standby state. Consequently, the portable information processing apparatus 1 is placed into a state wherein various operation processes can be carried out on the first operating system.

The CPU 101 supervises the state of the display section 3 based on a notification from the control section 117 at steps 0022 and 0024.

The control section 117 recognizes based on an on signal from the sensor SW2 that the display section 3 is tilted up and notifies the CPU 101 of this. Consequently, the CPU 101 detects the tilting up of the display section 3 at step 0024. In this instance, the CPU 101 advances the processing to step 0025, at which it carries out starting up of the second operating system or a returning process from the standby state. Consequently, the portable information processing apparatus 1 is placed into a state wherein various operation processes can be carried out on the second operating system. It is to be noted that, at this time, the first operating system is placed into a standby state.

After the portable information processing apparatus 1 enters an operating state by the second operating system, the CPU 101 supervises the tilt-down of the display section 3 at step 0026.

If the control section 117 recognizes based on an off signal of the sensor SW2 and an on signal of the sensor SW3 that the display section 3 is tilted down, that is, the display section 3 is moved to the retracted position P2, then it issues a notification of this to the CPU 101.

The CPU 101 detects based on the notification from the control section 117 that the display section 3 is tilted down and ends the operating state by the second operating system or places the second operating system into a standby state at step 0027. Then, the processing returns to step 0021, at which the CPU 101 returns the first operating system from the standby state to establish a state wherein various operation processes can be carried out on the first operating system.

When the display section 3 is positioned at the retracted position P2 and the portable information processing apparatus 1 is in a state wherein various operation processes can be carried out on the first operating system, if the control section 117 recognizes based on an off signal of the sensor SW3 and an on signal of the sensor SW1 that the display section 3 is slidably moved in the closing direction, that is, the display section 3 is slidably moved to the advanced position P1, then it issues a notification of this to the CPU 101.

The CPU 101 detects based on the notification from the control section 117 that the display section 3 is slidably moved in the closing direction, and advances the processing from step 0022 to step 0023, at which it carries out an ending process of the first operating system or a changing process to a standby state.

Through the process described above with reference to FIG. 12, if the user moves the display section 3 in the opening direction, then the first operating system is started up or restored to allow various operation processes to be carried out on the first operating system in the portable information processing apparatus 1.

Then, if the user tilts up the display section 3, then the second operating system is started or restored to establish a state wherein various operation processes can be carried out on the second operating system.

Accordingly, in a state wherein the display section 3 is merely slidably moved in the direction indicated by the arrow mark b from the advanced position P1 to the retracted position P2, the first operating system which starts up in short time is started up. Then, if a function is selected on the menu screen image of the display member 5 of FIG. 2, then utilization of a minimal function is permitted immediately although the function can be selected from a limited number of choices.

Now, a third example of a process of the portable information processing apparatus 1 is described with reference to FIG. 13.

Figure 13:
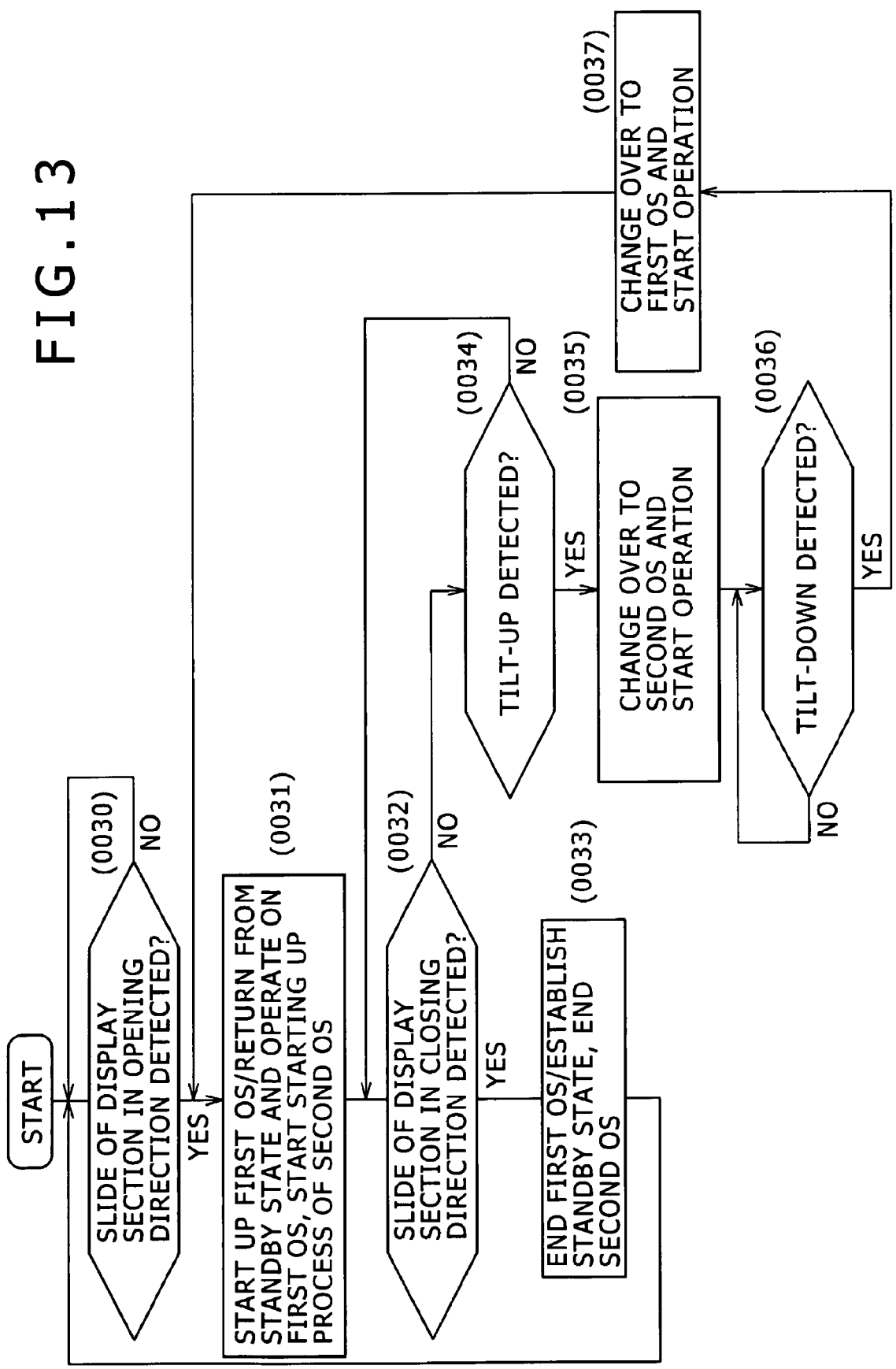

The CPU 101 of the portable information processing apparatus 1 carries out the process of FIG. 13 in response to the state of the switches SW1, SW2 and SW3 detected by the control section 117.

When the end portion of the display section 3 is at the advanced position P1, the CPU 101 decides at step 0030 after each predetermined interval of time whether or not the display section 3 is slidably moved in the opening direction with respect to the body section 2, that is, in the direction indicated by the arrow mark b.

The control section 117 normally supervises the state of the switches SW1, SW2 and SW3 and decides the position or the state of a sliding movement or a tilting movement of the display section 3 with respect to the body section 2 and then transmits the decided state to the CPU 101. Then, if the control section 117 detects a sliding movement of the display section 3 in the opening direction from an off signal of the sensor SW1 and an on signal of the sensor SW3, then it issues a notification of this to the CPU 101.

The CPU 101 detects the sliding movement of the display section 3 in the opening direction based on the notification from the control section 117 and advances the processing from step 0030 to step 0031.

At step 0031, the CPU 101 carries out starting up of the first operating system or a returning process from a standby state. Consequently, the portable information processing apparatus 1 is placed into a state wherein various operation processes can be carried out on the first operating system.

Also, the CPU 101 starts the starting up process of the second operating system.

The CPU 101 supervises the state of the display section 3 based on a notification from the control section 117 at steps 0032 and 0034.

The control section 117 recognizes based on an on signal from the sensor SW2 that the display section 3 is tilted up and notifies the CPU 101 of this. Consequently, the CPU 101 detects the tilting up of the display section 3 at step 0034. In this instance, the CPU 101 advances the processing to step 0035, at which it changes over the operation of the portable information processing apparatus 1 to operation by the second operating system. Since the starting up process of the second operating system was started at the stage at step 0031, in almost all cases, operation by the second operating system can be started immediately after the display section 3 is tilted up.

After the portable information processing apparatus 1 enters an operating state by the second operating system, the CPU 101 supervises the tilt-down of the display section 3 at step 0036.

If the control section 117 recognizes based on an off signal of the sensor SW2 and an on signal of the sensor SW3 that the display section 3 is tilted down, that is, the display section 3 is moved to the retracted position P2, then it issues a notification of this to the CPU 101.

The CPU 101 detects based on the notification from the control section 117 that the display section 3 is tilted down and changes over the operation state of the portable information processing apparatus 1 from the operation state by the second operating system to an operation state by the first operating system. Thereafter, the CPU 101 returns the processing to the supervision process at steps 0032 and 0034.

When the display section 3 is positioned at the retracted position P2 and the portable information processing apparatus 1 is in a state wherein various operation processes can be carried out on the first operating system, if the control section 117 recognizes based on an off signal of the sensor SW3 and an on signal of the sensor SW1 that the display section 3 is slidably moved in the closing direction, that is, the display section 3 is slidably moved to the advanced position P1, then it issues a notification of this to the CPU 101.

The CPU 101 detects based on the notification from the control section 117 that the display section 3 is slidably moved in the closing direction, and advances the processing from step 0032 to step 0033, at which it carries out an ending process of the first operating system or a changing process to a standby state. Further, the CPU 101 carries out an ending process of the second operating system.

Through the process described above with reference to FIG. 13, if the user moves the display section 3 in the opening direction, then the portable information processing apparatus 1 is placed into an operation state by the first operating system. Then, if the user tilts up the display section 3, then the portable information processing apparatus 1 is placed into an operation state by the second operating system.

Although particularly the second operating system demands time for starting up the same in comparison with the first operating system, since the starting up process of the second operating system is started when the first operating system remains in an operating state, the portable information processing apparatus 1 can enter an operation state by the second operating system rapidly after the display section 3 is tilted up.

The portable information processing apparatus 1 configured and operating in such a manner as described above has the following characteristics:

(A) Since the display section 3 carries out a sliding movement and tilting up and down movements at an upper portion of the body section 2 on which the keyboard 4 is provided, the portable information processing apparatus 1 can be used suitably in both of a case wherein it is used on a desk and another case wherein it is held by hand and used. Therefore, the portable information processing apparatus 1 is superior in convenience in use. Further, although the single portable information processing apparatus 1 is used, it can be used in various modes making use of the sliding movement and the two movements of the tiling up movement and the tilting down movement of the display section 3 with respect to the body section 2.

(B) Since the tilt-up and the tilt-down of the display section 3 are detected by the sensor SW2 and changeover between the first and second operating systems is carried out in response to the detection, automatic changeover between the first and second operating systems can be carried out.

(C) Since the second operating system is started up while starting of a sliding movement of the display section 3 from the first position P1 to the second position P2 is detected by the sensor SW1 and the first operating system operates, start-ing up of the second operating system is carried out quickly. Therefore, the portable information processing apparatus 1 is high in operability.

(D) Since the display section 3 carries out a sliding movement and tilting up and down movements at an upper portion of the body section 2 on which the keyboard 4 is provided, the portable information processing apparatus 1 can be used suitably in both of a case wherein it is used on a desk and another case wherein it is held by hand and used. Therefore, the portable information processing apparatus 1 is superior in convenience in use. Further, although the single portable information processing apparatus 1 is used, it can make use of the sliding movement and the two movements of the tiling up movement and the tilting down movement of the display section 3 with respect to the body section 2 to carry out automatic changeover of the mode between the hand writing mode wherein a touch pen or the like is used to carry out hand writing and the keyboard inputting mode wherein a keyboard is used for inputting. Consequently, diversification of mode changeover can be achieved.

(E) Since the tilt-up and tilt-down mechanism M2 of the display section 3 is configured for movement into and out of contact with the slide guides of the slide mechanism M1 for slidably moving the display section 3 between the first position P1 and the second position P2, changeover between the sliding movement of the display section 3 between the first position P1 and the second position P2 and the tilting up or down movement of the display section 3 can be carried out smoothly without being interrupted.

(F) Since the battery 8 accommodated in the body section 2 is disposed at a position displaced to the opposite side to the sliding direction of the display section 3 from the first position P1 to the second position P2 on the upper face 2a side of the display section 3 or the like, when the display section 3 is slidably moved to the second position P2 to open an upper portion of the display section 3, the portable information processing apparatus 1 can be stabilized in a horizontal posture making use of the weight of the battery 8 and a keyboard operation in this state can be carried out smoothly.

(G) Since it is detected by the sensor SW1 that a sliding movement of the display section 3 from the first position P1 to the second position P2 is started and it is detected by the sensor SW2 that a tilting up movement of the display section 3 is started at the second position P2 and besides the portable information processing apparatus 1 has the first inputting mode wherein the display section 3 is started up by the sensor SW1 and the second inputting mode wherein the display section 3 is started up by the sensor SW2, automatic changeover between the first inputting mode and the second inputting mode can be carried out only by carrying out a sliding operation and a tilting up operation of the display section 3. Therefore, the portable information processing apparatus 1 has high operability.

(H) Since the portable information processing apparatus 1 has the first display mode wherein the display section 3 is displayed on a first display screen image corresponding to the first input mode and the second display mode wherein the display section 3 is displayed on a second display screen image corresponding to the second input mode, automatic changeover of the mode between the first display mode and the second display mode can be carried out definitely.

(I) Since a tilt down movement of the display section 3 is detected to change over the mode of the display section 3 to the hand writing inputting mode, changeover from the keyboard inputting mode to the hand writing inputting mode can be carried out automatically. The portable information processing apparatus 1 has high operability in this regard.

While a preferred embodiment of the present invention has been described using specific terms, such description is for illustrative purpose only, and it is to be understood that changes and variations may be made without departing from the spirit or scope of the following claims.

For example, while, in the embodiment described above, the mechanism composed of the slide guides 15 formed on the lower face 3b of the display section 3 and the slide guides 13 and 14 formed on the upper faces 2a and 11a of the body section 2 and the sub body section 11 is used as the slide mechanism for slidably moving the display section 3 in the directions indicated by the arrow marks a and b on the body section 2, according to the present embodiment, the slide mechanism is not limited to the mechanism described, but various structures which can slidably move the display section in the directions indicated by the arrow marks a and b on the body section 2 can be used as the slide mechanism.

What is claimed is:

1. A portable information processing apparatus, comprising:
   a body section configured to have an upper face on which a keyboard for inputting information is provided at least;
   a display section configured to have an upper face on which a display member for displaying information is provided at least;
   said display section being mounted for sliding movement between a first position at which said display section is placed in an overlapping relationship at an upper portion of said body section and a second position at which said display section opens the upper portion of said body section,
   said display section being mounted for tilting up and down movements with respect to said body section when said display section is at the second position; and
   a battery accommodated in said body section and displaced toward a front face of said body section, in the opposite direction to the sliding direction of said body section when said body section slides from said first position to said second position.

2. The portable information processing apparatus according to claim 1, further comprising:
   a slide mechanism provided on said body section configured to slidably move said display section between the first position and the second position; and
   a tilt up and tilt down mechanism configured to tilt up and down said display section at the second position;
   said tilt up and tilt down mechanism being configured for movement into and out of contact with a slide guide of said slide mechanism.

3. The portable information processing apparatus according to claim 1, further comprising:
   a first sensor configured to detect that the sliding movement of said display section from the first position to the second position is started;
   a second sensor configured to detect that the tilting up movement of said display section at the second position is started; and
   a control section configured to establish a first inputting mode in response to the detection by said first sensor and establish a second inputting mode in response to the detection by said second sensor.

4. The portable information processing apparatus according to claim 3, wherein
   when the first inputting mode is established, said control section controls said display section to execute display corresponding to the first inputting mode, but
   when the second inputting mode is established, said control section controls said display section to execute display corresponding to the second inputting mode.

5. The portable information processing apparatus according to claim 3, wherein said control section establishes a hand writing inputting mode when the tilting down movement of said display section is detected.

* * * * *